United States Patent
Coldren et al.

(10) Patent No.: US 9,518,518 B2
(45) Date of Patent: Dec. 13, 2016

(54) DUAL FUEL COMMON RAIL TRANSIENT PRESSURE CONTROL AND ENGINE USING SAME

(71) Applicant: Caterpillar, Inc., Peoria, IL (US)

(72) Inventors: Dana R. Coldren, Secor, IL (US);
Steven Thomas Grant, Groveland, IL (US); Frank Lombardi, Metamora, IL (US); Daniel R. Puckett, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 904 days.

(21) Appl. No.: 13/866,303

(22) Filed: Apr. 19, 2013

(65) Prior Publication Data

US 2014/0311444 A1    Oct. 23, 2014

(51) Int. Cl.
| | |
|---|---|
| *F02D 19/06* | (2006.01) |
| *F02D 41/32* | (2006.01) |
| *F02D 41/00* | (2006.01) |
| *F02D 19/10* | (2006.01) |
| *F02D 41/38* | (2006.01) |
| *F02D 41/40* | (2006.01) |

(52) U.S. Cl.
CPC ....... *F02D 41/0025* (2013.01); *F02D 19/0694* (2013.01); *F02D 41/0027* (2013.01); *F02D 41/3836* (2013.01); *F02D 19/061* (2013.01); *F02D 19/0605* (2013.01); *F02D 19/10* (2013.01); *F02D 41/3845* (2013.01); *F02D 41/403* (2013.01); *F02D 2041/3881* (2013.01); *F02D 2200/0602* (2013.01)

(58) Field of Classification Search
CPC F02D 41/0025; F02D 41/0027; F02D 41/403; F02D 41/3836; F02D 41/3845; F02D 19/10; F02D 19/061; F02D 19/0605; F02D 19/0694; F02D 2200/0602; F02D 2041/3881
USPC ........... 123/27 GE, 299, 304, 379, 382, 387, 525,123/526; 701/103, 104
See application file for complete search history.

(56) References Cited

U.S. PATENT DOCUMENTS

| | | | |
|---|---|---|---|
| 5,868,121 | A | 2/1999 | Brown et al. |
| 6,298,833 | B1 | 10/2001 | Douville et al. |
| 7,463,967 | B2 | 12/2008 | Ancimer et al. |
| 7,627,416 | B2 | 12/2009 | Batenburg et al. |
| 7,757,662 | B2 | 7/2010 | Cooke |
| 8,028,676 | B2 | 10/2011 | Ancimer et al. |
| 8,126,636 | B2 | 2/2012 | Jauss |
| 8,166,956 | B2 | 5/2012 | Ulrey et al. |
| 2011/0288751 | A1* | 11/2011 | Kurtz .................. F02D 41/0025 701/109 |
| 2012/0285417 | A1* | 11/2012 | Kim .................... F02D 19/0684 123/299 |

(Continued)

*Primary Examiner* — Hieu T Vo
*Assistant Examiner* — Arnold Castro

(57) ABSTRACT

A compression ignition engine is fueled from common rail fuel injectors that predominately inject natural gas fuel that is compression ignited with a small pilot injection of liquid diesel fuel. Before and after a rapid load loss transient, the liquid and gaseous rail pressures are controlled toward respective pressures based upon engine speed and load. During the transient, the liquid rail pressure is controlled relative to the gas rail pressure in order to maintain the liquid rail pressure greater than the gas pressure during the transient to avoid migration gaseous fuel into the liquid fuel side of the system.

20 Claims, 6 Drawing Sheets

(56) References Cited

U.S. PATENT DOCUMENTS

| | | | |
|---|---|---|---|
| 2014/0067234 A1* | 3/2014 | Brown | F02D 41/3845 701/104 |
| 2014/0238352 A1* | 8/2014 | Methil | F02M 69/50 123/456 |
| 2014/0331963 A1* | 11/2014 | Grant | F02D 19/0694 123/304 |

* cited by examiner

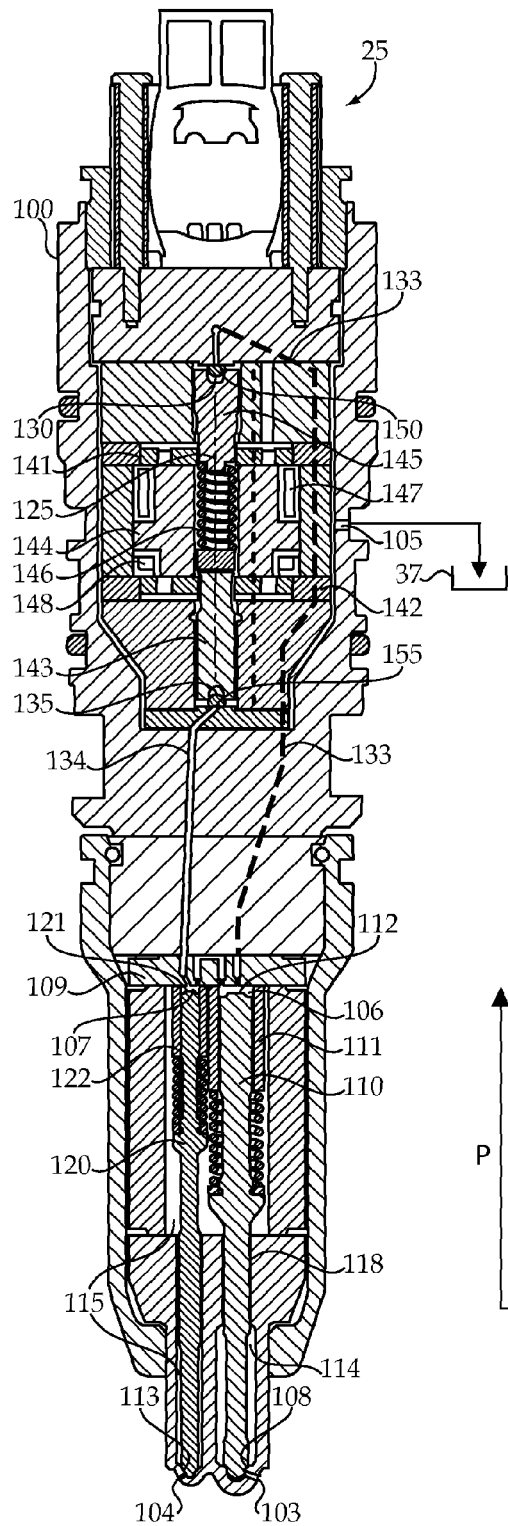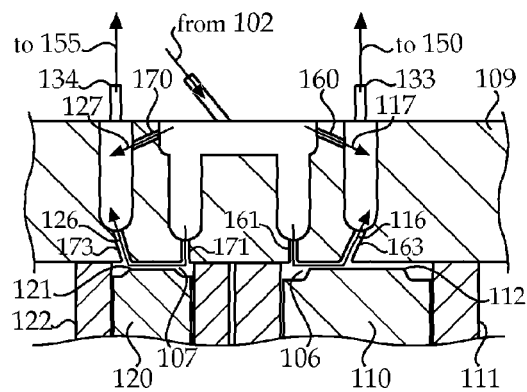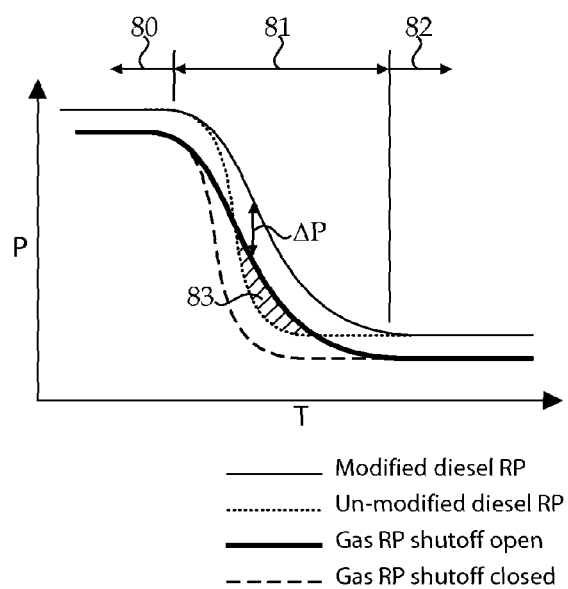
Fig.5
Fig.6
Fig.7
— Modified diesel RP
⋯⋯ Un-modified diesel RP
━ Gas RP shutoff open
--- Gas RP shutoff closed

DUAL FUEL COMMON RAIL TRANSIENT PRESSURE CONTROL AND ENGINE USING SAME

TECHNICAL FIELD

The present disclosure relates generally to dual fuel compression ignition engines, and more particularly to a common rail pressure control strategy during a load loss transient.

BACKGROUND

Natural gas is increasingly becoming an attractive alternative for fueling internal combustion engines. In one specific example, a compression ignition engine is fueled predominately with natural gas originating from a gaseous fuel common rail, and liquid diesel fuel from a liquid fuel common rail that are directly injected into each engine cylinder. Both fuels are injected from the same fuel injector, and the relatively large charge of gaseous fuel is ignited by compression igniting a small pilot injection quantity of liquid diesel fuel. When both fuels are injected from a single fuel injector, there is a possibility of gaseous fuel migrating into the liquid side, and vice versa, which can lead to undermining proper operation of the fuel system. Co-owned U.S. Patent Application Publication No. 2012/0285417 shows an example of such a dual fuel system. During typical operation, the liquid fuel pressure is maintained greater than the gaseous fuel pressure to inhibit migration of gaseous fuel into the liquid fuel side of the fuel system. Pressure in the liquid fuel common rail can be changed quickly due to the relative incompressibility of the liquid fuel. However, changing pressure in the gaseous fuel common rail is far different due to the highly compressible nature of the gaseous fuel. Reducing pressure in the gaseous fuel common rail during a load loss transient without venting substantial amounts of gas to atmosphere can be difficult, while maintaining a pressure differential that inhibits migration of gaseous fuel into the liquid fuel side of the fuel system.

The present disclosure is directed toward one or more of the problems set forth above.

SUMMARY

In one aspect, a method of operating an engine includes injecting gaseous fuel and liquid fuel directly into an engine cylinder from a gaseous nozzle outlet set and a liquid nozzle outlet set, respectively, of a fuel injector. The injected liquid fuel is compression ignited to in turn ignite the gaseous fuel. Migration of gaseous fuel into liquid fuel within the fuel injector is inhibited by maintaining a liquid rail pressure greater than a gas rail pressure. The migration inhibiting step includes executing a first rail pressure control algorithm before and after a transient, and executing a second rail pressure control algorithm during the transient. The transient is initiated by changing from a high fuel demand state of a first speed and load to a low fuel demand state of a second speed and load.

In another aspect, an engine includes an engine housing that defines a plurality of cylinders within which a plurality of respective pistons reciprocate to define a compression ratio greater than 14:1. A gaseous fuel common rail and a liquid fuel common rail are fluidly connected to each of the plurality of fuel injectors, which each include a gaseous nozzle outlet set and liquid nozzle outlet set positioned for direct injection into one of the cylinders. A means for inhibiting migration of gaseous fuel into liquid fuel within the fuel injector includes an electronic controller configured to execute a first rail pressure control algorithm to maintain liquid pressure greater than a gas rail pressure before and after a transient, and execute a second rail pressure control algorithm to maintain a liquid rail pressure greater than a gas rail pressure during the transient. The transient includes changing from a high fuel demand state of a first speed and load to a low fuel demand state of a second speed and load.

BRIEF DESCRIPTION OF THE DRAWINGS

FIG. 5 is a front sectioned view of a fuel injector for the engine of FIGS. 2-5;

FIG. 6 is an enlarged sectioned view of a control portion of the fuel injector of FIG. 5;

FIG. 7 is a graph of liquid and gaseous rail pressures versus time before, during and after a rapid load loss transient event.

DETAILED DESCRIPTION

Figure 1:
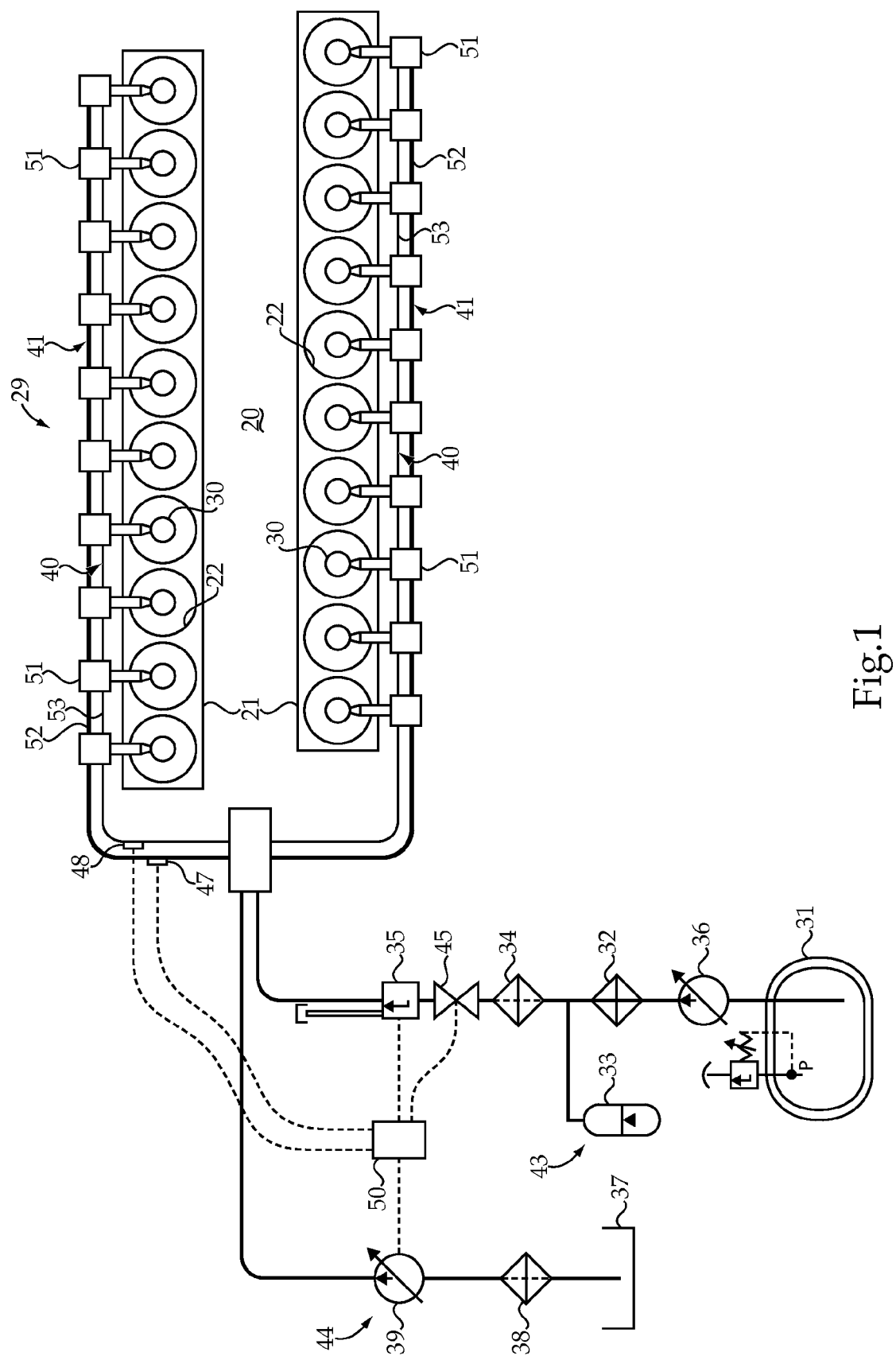
FIG. 1 is a schematic view of an engine according to another aspect of the present disclosure.
Figure 2:
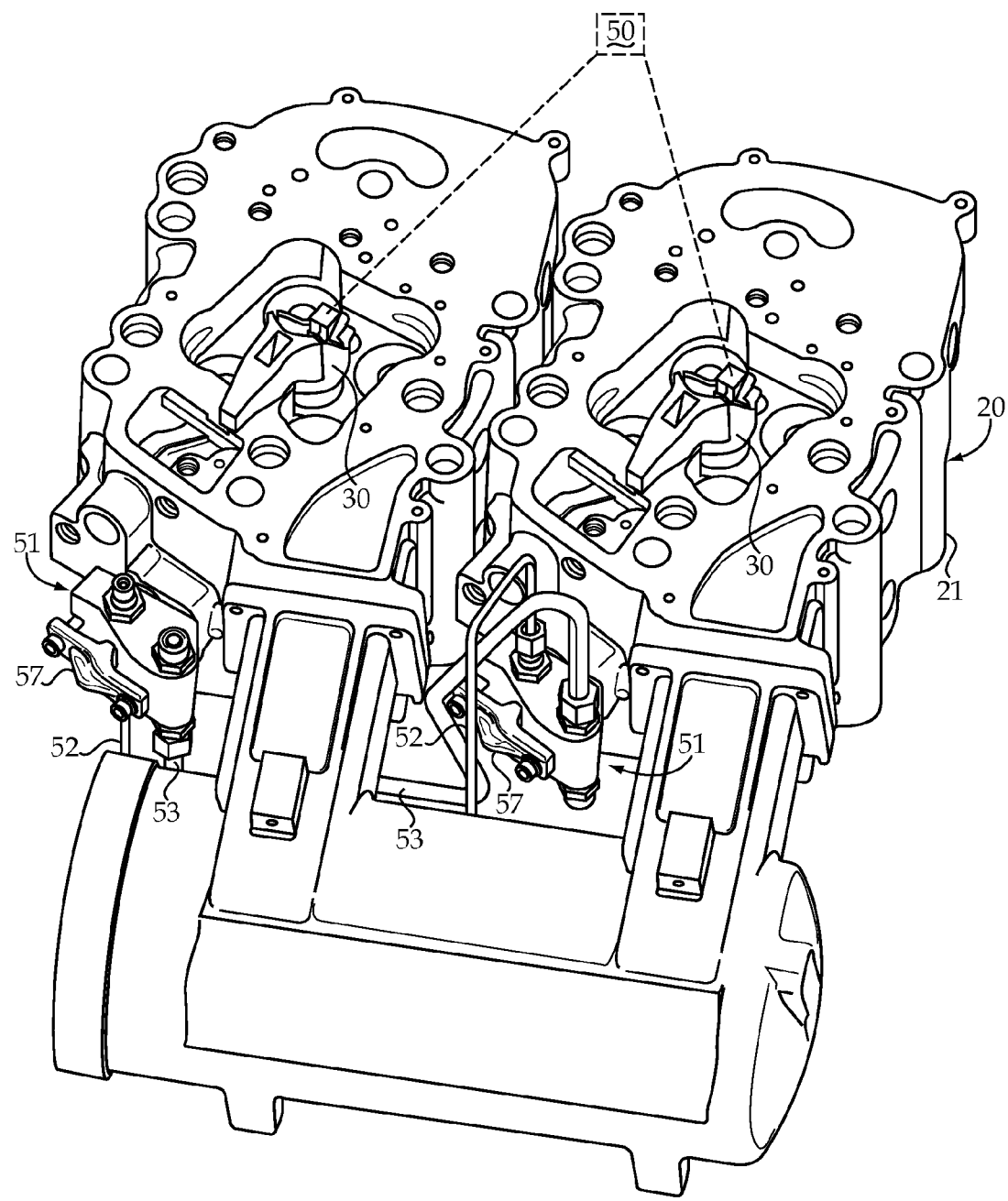
FIG. 2 is a perspective view of a portion of the engine shown in FIG. 2.
Figure 3:
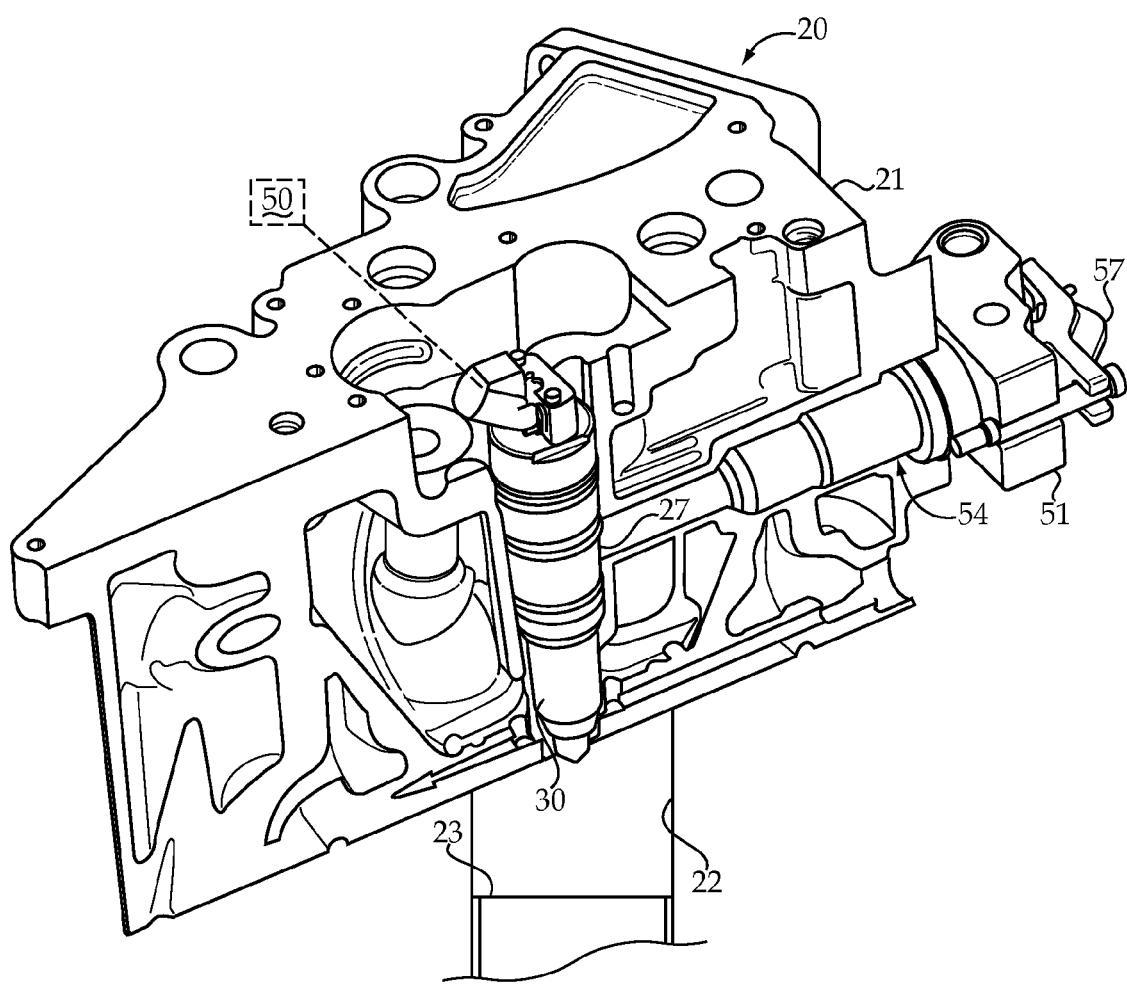
FIG. 3 is a sectioned perspective view through a portion of the engine shown in FIG. 2.

Referring initially to FIGS. 1-4, a dual fuel engine 20 includes an engine housing 21 that defines a plurality of engine cylinders 22. Although not visible in FIG. 1, engine 20 may be supported on machine body in a manner well known in the art. A piston 23 reciprocates in each of the cylinders 22 to define a compression ratio greater than 14:1, which is generally associated with a compression ratio suitable for compression igniting injected liquid diesel fuel. In the illustrated embodiment, engine 20 includes twenty engine cylinders 22. However, those skilled in the art will appreciate that an engine with any number of cylinders would also fall within the intended scope of the present disclosure. A dual fuel common rail system 29 includes exactly one fuel injector 30 positioned for direct injection into each of the plurality of engine cylinders 22. The dual fuel common rail system 29 includes a gaseous fuel common rail 40 and a liquid fuel common rail 41 that are fluidly connected to a gaseous fuel inlet 101 and a liquid fuel inlet 102, respectively, of each fuel injector 30. The dual fuel common rail system 29 includes gas supply of pressure control devices 43 that supply gaseous fuel to and control pressure in the gaseous fuel common rail 40. The gas supply and pressure control devices 43 may include a pressurized cryogenic liquid natural gas tank 31 with an outlet fluidly connected to a variable delivery cryogenic pump 36, and may also include a heat exchanger 32, an accumulator 33, a gas filter 34 and a fuel conditioning module 35 that controls the pressure of gaseous fuel in gaseous fuel common rail 40. Liquid supply and pressure control devices 44 may include a diesel fuel tank 37, fuel filters 38 and an electronically controlled high pressure fuel pump 39 that supplies liquid fuel to, and controls pressure in, liquid fuel common rail 41.

A shutoff valve 45 may be located to isolate gaseous fuel common rail 40 from the supply portion of the gaseous fuel supply and pressure control devices 43, namely the accumulator 33 and cryogenic pump 36. An electronic controller 50 may be in control communication with shutdown valve 45, the liquid supply and pressure control devices 44, the gaseous supply and pressure control devices 43 as well as each of the fuel injectors 30. Pressure sensors 47 and 48 may communicate liquid and gaseous fuel pressure, respectively, to electronic controller 50.

Although not necessary, the gaseous fuel common rail 40 and the liquid fuel common rail 41 may be made up of a plurality of daisy chained blocks 51 that are connected in series with liquid fuel lines 52 and gaseous fuel lines 53. The liquid and gaseous fuels may be supplied to the individual fuel injectors 30 with a coaxial quill assembly 54 that includes an inner quill 55 that is positioned within an outer quill 56. Liquid fuel is supplied to the fuel injector 30 through inner quill 55, and gaseous fuel is supplied to fuel injector 30 in the space between inner quill 55 and outer quill 54. A load adjusting clamp 57 may be utilized with each block 51 for pushing the coaxial quill assembly 54 so that both the inner quill 55 and the outer quill 56 seat on a common conical seat 27 of each fuel injector 30.

Figure 4:
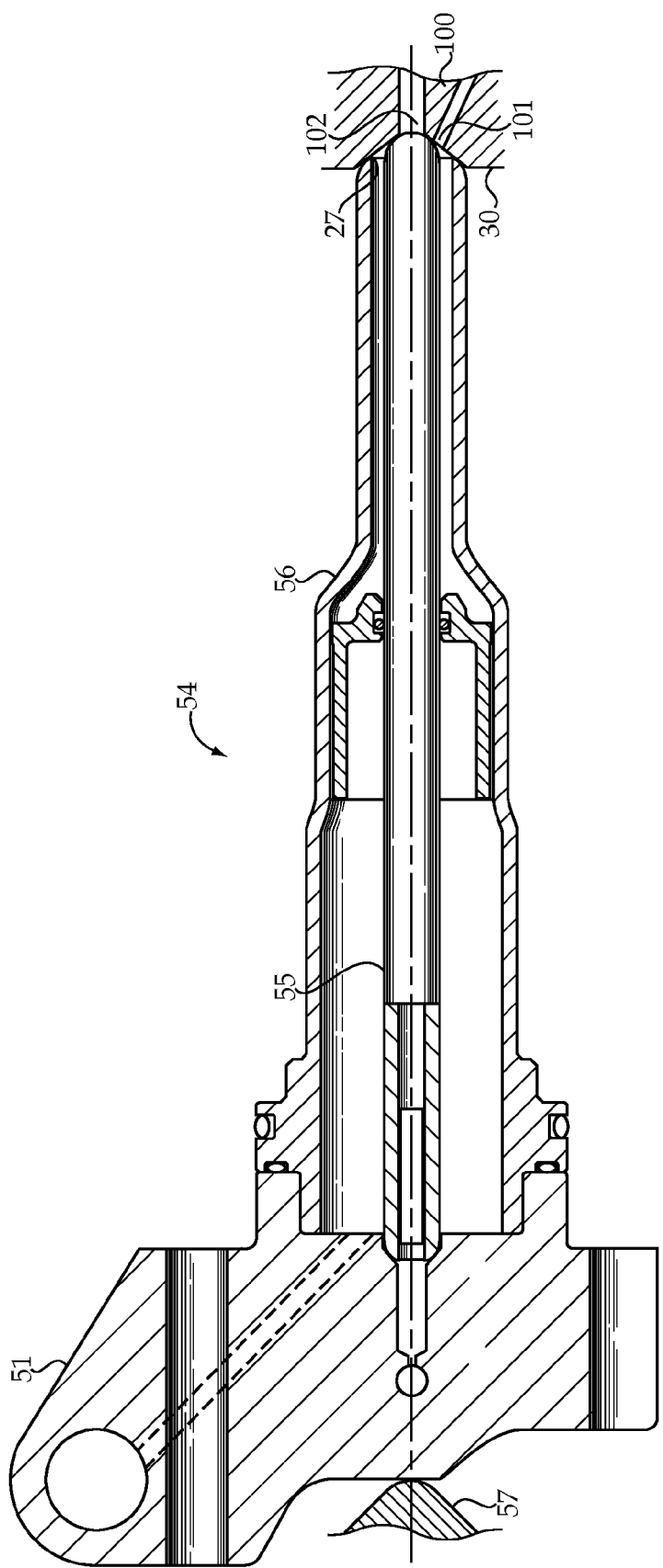
FIG. 4 is a sectioned side view of a concentric quill assembly for supplying gaseous and liquid fuels to individual fuel injectors.

Referring in addition to FIGS. 5 and 6, an example fuel injector 30 for use in the engine 20 is illustrated. Fuel injector 30 includes an injector body 100 that defines a gaseous fuel inlet 101 for gaseous fuel and a liquid fuel inlet 102 for liquid fuel that both open through common conical seat 27 (FIG. 4). The gaseous fuel inlet 101 is fluidly connected to a gaseous nozzle chamber 114 disposed within injector body 100 via a passageway not visible in the sectioned view of FIG. 5. Likewise, the liquid fuel inlet 102 is fluidly connected to a liquid nozzle chamber 115 via a passageway not visible in the sectioned view of FIG. 5. In the embodiment shown, the liquid nozzle chamber 115 is separated from the gaseous nozzle chamber 114 by a check guide area 118 associated with gaseous check valve member 110. Although other locations exist, such as where the coaxial quill 54 contacts the common conical seat 27 of injector body 100, migration of one fuel into the other fuel is possible in the guide clearance that exists in check guide area 118. As discussed in the background, migration of gaseous fuel from gaseous nozzle chamber 114 into liquid nozzle chamber 115 can be inhibited by maintaining the liquid fuel pressure in liquid fuel common rail 41 higher than the pressure in gaseous fuel common rail 40. For instance, at rated conditions, the liquid fuel rail 41 might be maintained about 40 MPa, whereas the gaseous fuel common rail might be maintained at about 35 MPa. At idle the respective liquid and gas rail pressures might be maintained at 25 and 20 MPa, respectively. This pressure differential may inhibit gaseous fuel from migrating into the liquid fuel, but may permit a small amount of liquid fuel to migrate along guide area 118 from liquid nozzle chamber 115 to gaseous nozzle chamber 114. This small amount of leakage may be beneficial for lubricating both the check guide area 118 and the seat 108 associated with gaseous check valve member 110.

Injector body 100 defines a gaseous nozzle outlet set 103, a liquid nozzle outlet set 104 and a drain outlet 105. Disposed within injector body 100 are a first control chamber 106 and a second control chamber 107. A gaseous check valve member 110 has a closing hydraulic surface 112 exposed to fluid pressure in the first control chamber 106. The gaseous check valve member 110 is movable between a closed position, as shown, in contact with a first nozzle seat 108 to fluidly block the gaseous fuel inlet 101 to the gaseous nozzle outlet set 103, and an open position out of contact with the first nozzle seat 108 to fluidly connect the gaseous fuel inlet 101 to the gaseous nozzle outlet set 103. First control chamber 106 may be partially defined by a first sleeve 111.

A liquid check valve member 120 has a closing hydraulic surface 121 exposed to fluid pressure in the second control chamber 107. The liquid check valve member 120 is movable between a closed position, as shown, in contact with a second nozzle seat 113 to fluidly block the liquid fuel inlet 102 to the liquid nozzle outlet set 104, and an open position out of contact with the second nozzle seat 113 to fluidly connect the liquid fuel inlet 102 to the liquid nozzle outlet set 104. The second control chamber 107 may be partially defined by a second sleeve 122. Thus, injection of gaseous fuel through gaseous nozzle outlet set 103 is facilitated by movement of gaseous check valve member 110, while injection of a liquid fuel through liquid nozzle outlet set 104 is facilitated by movement of the liquid check valve member 120.

A first control valve member 130 is positioned in injector body 100 and is movable along a common centerline 125 between a first position in contact with first valve seat 150 at which the first control chamber 106 is fluidly blocked to the drain outlet 105, and a second position at which the first control chamber 106 is fluidly connected to the drain outlet 105. When first control chamber 106 is fluidly connected to drain outlet 105, pressure in first control chamber 106 drops, relieving pressure on closing hydraulic surface 112 to allow gaseous check valve member 110 to lift to facilitate an injection of the gaseous fuel through gaseous nozzle outlet set 103. A second control valve member 135 is positioned in the injector body 100 and movable along the common centerline 125 between a first position in contact with second valve seat 155 at which the second control chamber 107 is fluidly blocked to the drain outlet 105, and a second position at which the second control chamber 107 is fluidly connected to the drain outlet 105. When second control chamber 107 is fluidly connected to drain outlet 105, fluid pressure acting on closing hydraulic surface 121 is relieved to allow liquid check valve member 120 to lift to an open position to facilitate injection of the liquid diesel fuel through the liquid nozzle outlet set 104.

In the illustrated embodiment, the first and second control valve members 130, 135 are intersected by the common centerline 125. The respective control valve members 130, 135 may be moved to one of their respective first and second positions with first and second electrical actuators that include first and second coils 147, 148, respectively. The control valve members 130, 135 may be biased to the their respective first positions by a shared biasing spring 146. A first armature 141 may be attached to a pusher 145 in contact with first control valve member 130. A second armature 142 may be operably coupled to move the second control valve member 135 by way of a pusher 143. A shared stator 144 houses first and second coils 147, 148 and separates the first armature 141 from the second armature 142.

In the illustrated embodiment, the first control chamber 106 may always be fluidly connected to the high pressure in the liquid fuel inlet 102 via an F orifice 160 and a Z orifice 161. The upstream ends of respective F and Z orifices 160 and 161 may be fluidly connected to the liquid fuel inlet 102 via passages not visible in the sectioned views. The first control chamber 106 is fluidly connected to a control passage 133 via a so called A orifice 163. Thus, when first control valve member 130 lifts off of first valve seat 150, the second fuel inlet 102 becomes fluidly connected to the drain outlet 105 through a Z-A pathway 116 and an F pathway 117 that are fluidly in parallel with each other.

The second control chamber 107 may always be fluidly connected to the high pressure in liquid fuel inlet 102 via an F orifice 170 and a Z orifice 171. The upstream ends of respective F and Z orifices 170, 171 may be fluidly connected to the liquid fuel inlet 102 via passages not visible in the sectioned view. The second control chamber 107 is fluidly connected to a control passage 134 via a so-called A orifice 173. Thus, when the second control valve member 135 moves off of the second valve seat 155, the second fuel inlet 102 becomes fluidly connected to the drain outlet 105 through a Z-A pathway 126 and an F pathway 127 that are fluidly in parallel with each other.

Those skilled in the art will appreciate that the illustrated embodiment utilizes liquid diesel fuel to control movement of the gaseous check valve member 110 and the liquid check valve member 120 to facilitate control over gaseous fuel injection events and liquid diesel fuel injection events, respectively.

Apart from electronic controller 50 including various control algorithms for operating engine 20 in dual fuel modes at various speeds and loads, the present disclosure also teaches equipping the electronic controller with a means for inhibiting migration of gaseous fuel into liquid fuel within the fuel injector 30. This means includes electronic controller 50 being configured to execute a first rail pressure control algorithm to maintain liquid rail pressure greater than a gas rail pressure before and after a transient, and execute a second rail pressure control algorithm to maintain the liquid rail pressure greater than the gas rail pressure during the transient. Although those skilled in the art will appreciate that many different engine transitions exist, a transient according to the present disclosure includes changing from a high fuel demand state of a first speed and load to a low fuel demand state of a second speed and load.

In one specific example, a transient according to the present disclosure might include transitioning from a rated engine condition at which a liquid and gaseous rail pressures are controlled toward 40 MPa and 35 MPa, respectively, to an idle condition at which the respective liquid and gaseous fuel pressures are controlled to 25 and 20 MPa. These respective target pressures may be part of an overall engine design and stored in a lookup table available to electronic controller 50 based upon engine speed and load in a manner well known in the art. In general, pressure in either the liquid fuel common rail 41 or the gaseous fuel common rail 40 generally require injection events in order to reduce pressure. The nearly incompressible nature of liquid fuel makes lowering pressure quick even with only a small volume of injected fuel. However, the compressible nature of the gaseous fuel may require significantly larger volumes of fuel injection for a similar drop in pressure.

A first rail pressure control algorithm may be configured to control the liquid rail pressure toward a first predetermined target pressure based upon the first engine speed and load, and control the gaseous rail pressure toward a first gas pressure that is lower than the first predetermined target pressure prior to the transient. The first rail pressure control algorithm is also configured to control the liquid rail pressure toward a second predetermined target pressure based upon the second engine speed and load, and control the gaseous rail pressure toward a second gas pressure that is lower than the second predetermined target pressure after the transient. The second rail pressure control algorithm is configured to control the liquid rail pressure toward a transient target pressure that equals the gas rail pressure plus a bias pressure, and control the gaseous rail pressure toward the second gas pressure during the transient.

Those skilled in the art will appreciate that lowering the liquid rail pressure or the gaseous rail pressure may include reducing or temporarily stopping output from the liquid supply and pressure control devices 44 and the gas supply and pressure control devices 43, respectively. In some instances, depending upon hardware chosen, the cryogenic pump and maybe accumulator 33 may be sluggish in responding to temporarily stopping resupply of gaseous fuel common rail 40. Thus, the present disclosure might also teach the second pressure control algorithm being configured to close a shut off valve 45 during the transient. This strategy can quickly stop resupply of gaseous fuel to gaseous fuel common rail 40 allowing a quicker reduction in pressure. The shut off valve 45 may be reopened toward the end of the transient.

Another strategy that may be employed according to the present disclosure would be to inject fuel in less than all of the engine cylinders during the transient. In other words, a cylinder cutout strategy can result in proportionally more fuel in a given engine cycle being allocated to gaseous fuel rather than liquid fuel, assuming that there is a desire to inject at or near a minimum controllable liquid injection quantity at almost all engine operating conditions. The electronic controller 50 would likely cycle through different sets of active and inactive cylinders 22 if the cylinder cutout strategies were utilized. The second pressure control algorithm is preferably configured to avoid venting gas from the gaseous fuel common rail to atmosphere during the transient as a portion of a strategy for reducing pressure. However, the second pressure control algorithm could potentially include some gas venting to atmosphere without departing from the present disclosure in a less than preferred version of the present disclosure.

Referring now to FIG. 7, the respective gaseous and liquid rail pressures are plotted against time before during and after a transient with and without the pressure control teachings of the present disclosure. The dotted line shows that the liquid rail pressure can be quickly dropped to a new low target pressure using known typical rail pressure control techniques. However, the heavy solid line shows that the gas rail pressure is slower in responding to desired drops in pressure using conventional control strategies and with the shutoff valve 45 open or not included. These pressure traces can result in an overlap region 83 during which the gaseous rail pressure briefly exceeds the liquid rail pressure during a transient, possibly resulting in some undesirable migration of gaseous fuel into the liquid fuel within fuel injector 30 across check guide area 118. As discussed earlier, during the pretransient period 80, and during post transient time 82, the respective gaseous and liquid rail pressures are controlled to predetermined target pressures based upon engine speed and load. During transient 81, the liquid rail pressure (light solid line) may be controlled relative to the gas rail pressure by driving the liquid rail pressure toward a pressure that equals the instantaneous gas rail pressure plus a ΔP during transient 81 to avoid an overlap region 83 from occurring. The heavy dash line shows that the closure of the shut off valve 45 can potentially hasten the duration of a transient event 81 according to the present disclosure, but is not required.

INDUSTRIAL APPLICABILITY

The present disclosure applies broadly to any engine that utilizes two fluidly distinct common rails to deliver gaseous and liquid fuels to a single fuel injector associated with each engine cylinder. The present disclosure is specifically applicable to a strategy for controlling pressures in the common rails as part of a transient pressure control strategy. Finally, the present disclosure is directed to a liquid rail pressure control strategy during a transient with reduced reliance on, and possible elimination of, a need to vent natural gas to atmosphere in order to transition through a rapid load loss transient.

Gaseous fuel is supplied from the gaseous fuel common rail 40 to each of the plurality of fuel injectors 30 by a respective co-axial quill assembly 54. Likewise, liquid fuel from a liquid fuel common rail 41 is supplied to each of the plurality of fuel injectors 30 by the same respective co-axial quill assemblies 54. When in operation, gaseous fuel is injected from each fuel injector 30 into an engine cylinder 22 responsive to a gaseous fuel injection signal communicated from electronic controller 50 to the fuel injector 30. In particular, a gaseous fuel injection event is initiated by energizing the upper electrical actuator (upper coil 147) to move armature 141 and first control valve member 130 downward out of contact with first valve seat 150. This fluidly connects control chamber 106 to drain outlet 105 to reduce pressure acting on closing hydraulic surface 112. The gaseous fuel check valve member 110 then lifts out of contact with first nozzle seat 108 to commence spray of gaseous fuel out of gaseous nozzle outlet set 103. The injection event is ended by de-energizing the upper electrical actuator to allow armature 141 and control valve member 130 to move upward under the action of spring 146 back into contact to close first valve seat 150. When this occurs, pressure abruptly rises in control chamber 106 acting on closing hydraulic surface 112 to push gaseous check valve member 110 back downward into contact with seat 108 to end the gaseous fuel injection event.

Also, liquid fuel from the fuel injector 30 is injected directly into engine cylinder 22 from the same fuel injector 30 responsive to a liquid fuel injection signal from electronic controller 50. In particular, a liquid fuel injection event is initiated by energizing the lower coil 148 to move armature 142 upward along common centerline 125. This causes pusher 143 to move second control valve member 135 out of contact with second valve seat 155. This in turn relieves pressure in control chamber 107 allowing liquid check valve member 120 to lift out of contact with second nozzle seat 113 to commence a liquid fuel injection event out of liquid nozzle outlet set 104. To end the liquid injection event, the lower electrical actuator (lower coil 148) is de-energized. When this is done, shared biasing spring 146 pushes armature 142 and second control valve member 135 back up into contact with second valve seat 155 to close the fluid connection between control chamber 107 and drain outlet 105. When this is done, pressure acting on closing hydraulic surface 121 quickly rises causing liquid check valve member 120 to move downward and back into contact with second nozzle seat 113 to end the liquid fuel injection event. Both liquid and natural gas injection events are ended by fluidly connecting the respective control chambers 107, 106 to the liquid fuel common rail 22 through respective F orifices 160, 170, and Z orifices 161, 171 that are fluidly in parallel.

Because of its high compression ratio (greater than 14:1) the injected liquid fuel will compression ignite in each of the respective engine cylinders 22. The injected gaseous fuel is ignited in a respective one of the engine cylinders responsive to the compression ignition of the liquid fuel.

The present disclosure also teaches that a higher ratio of gaseous fuel to liquid fuel may be injected in a given engine cycle by utilizing a cylinder cutout strategy in which the gaseous fuel and liquid fuel are injected in less than all of the engine cylinders 22 in an engine cycle. Proportionally more gaseous fuel may be injected and burned if maybe only half the cylinders are active. If this option is utilized, the electronic controller 50 may cycle through different combinations of active and inactive cylinders 22 in each engine cycle for reasons well known in the art.

Figure 8:
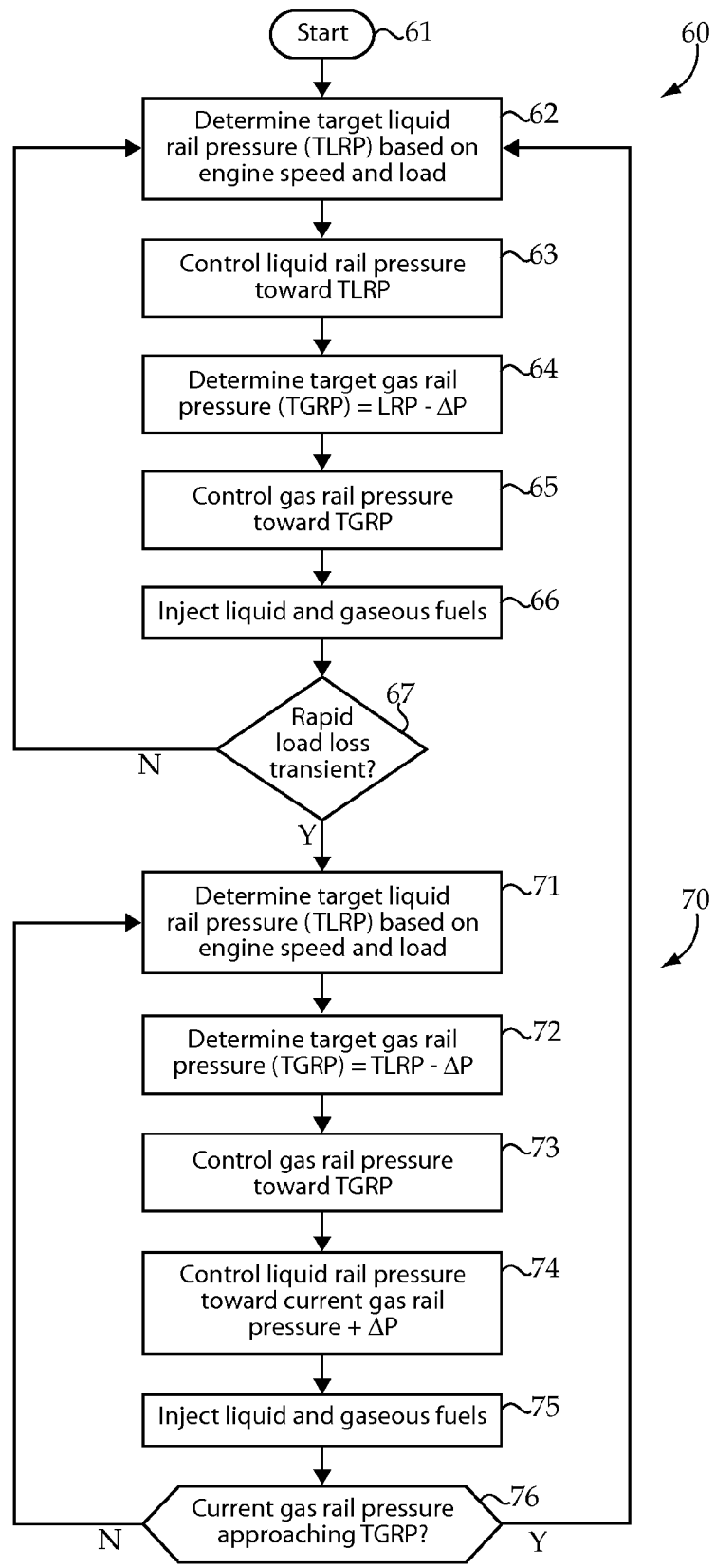
FIG. 8 is logic flow diagram showing a first rail pressure control algorithm used before and after a transient, and a second rail pressure control algorithm for use during the transient.

Referring now to FIG. 8, an example flow diagram according to the present disclosure includes a first rail pressure control algorithm 60 and a second rail pressure control algorithm 70. The logic starts at oval 61 and proceeds to box 62 where a target liquid rail pressure (TLRP) is determined based upon engine speed and load. At box 63, the liquid rail pressure is controlled toward the target liquid rail pressure. This may be done in a conventional manner by sensing the pressure in liquid fuel common rail 41 with pressure sensor 47 and communicating that information to electronic controller 50. Electronic controller 50 may then utilize a closed loop control algorithm to adjust output from high pressure pump 39 to drive the liquid rail pressure toward the target liquid rail pressure. At box 64, a target gas rail pressure is determined that is lower than the target rail pressure by some ΔP, which may be on the order of maybe 5 MPa. Next at box 65, the gas rail pressure is controlled toward the target gas rail pressure. This step may be performed based upon pressure information communicated to electronic controller 50 by pressure sensor 48, which senses the pressure in gaseous fuel common rail 40. In other words, the gas rail pressure may also be controlled in a closed loop fashion using an appropriate algorithm executed by electronic controller 50, or may be controlled at least partially mechanically responsive simply to the pressure in the liquid fuel common rail 41. At box 66, electronic controller 50 generates liquid and gaseous injection control signals to inject liquid and gaseous fuels into each of the engine cylinders 22. At query 67, the logic determines whether a rapid load loss transient has been initiated. For instance, if engine 20 were utilized for propulsion in a large mining truck, cresting a hill with a full load could cause a rapid load loss transient event by changing the engine from a high fuel demand first speed and load to a low fuel demand second speed and load. If query 67 returns a negative, the logic loops back to block 62 and continues controlling the liquid and gas rail pressures in the liquid fuel common rail 41 and gaseous fuel common rail 40, according to the first pressure control algorithm 60.

If query 67 is positive, that indicates a rapid load loss transient, and the logic advances to block 71 to execute the second rail pressure control algorithm 70 according to the present disclosure. At block 71, a target liquid rail pressure is determined based upon the new lower engine speed and load. Next at block 72, a target gas rail pressure is determined by subtracting a pressure differential ΔP (e.g., 5 MPa) from the target liquid rail pressure. Next, at block 73, the gas rail pressure is controlled toward the target gas rail pressure. This step may or may not include closing shut off valve 45, and may include a cylinder cutout strategy to allocate more fuel injection to gaseous fuel from liquid fuel in order to meet the new lower engine speed and load fueling demand. In any event, this step primarily includes injection of as much gaseous fuel as possible during the transient 81 (FIG. 7) in order to remove gas from the gaseous fuel common rail, while meeting the engine's fueling demand, to drive the gaseous rail pressure toward the new lower target gaseous rail pressure. At block 74, the liquid rail pressure is controlled toward the gas rail pressure plus a ΔP (e.g., 5 MPa). This step recognizes that the liquid rail pressure may not be able to be lowered toward a new target liquid rail pressure based upon the new lower engine speed and load as quickly as the liquid system could react. Instead, step 74 maintains the liquid rail pressure some bias pressure $\Delta P$ greater than the instantaneous gas rail pressure as communicated to electronic controller 50 by the pressure sensor 48. At block 75, the electronic controller 50 communicates liquid and gaseous injection control signals to the fuel injectors 30 to inject liquid and gaseous fuels. As stated earlier, this step may include a cylinder cutout strategy, but likely will result in injecting a minimum controllable liquid injection in the active cylinders, with the minimum controllable injection quantity being related to the liquid rail pressure at that time. In extreme instances, the accumulated minimum liquid fuel injection quantities may nearly or completely meet the instantaneous engine fueling demand resulting in temporary injection of only liquid fuel in one or more engine cycles during transient 81. At query 76, the logic asks whether the current gas rail pressure is approaching the new lower target gas rail pressure. If not, the logic loops back to block 71 and continues execution of the second rail pressure control algorithm 70 indicating that the transient 81 is not yet complete. If query 76 returns a positive, the transient 81 is nearing completion and may now loop back up to block 62 and begin executing the first rail pressure control algorithm 60 indicating that the transient is now over. In other words, and in reference to FIG. 7, the system has now reached the post transient phase 82.

Because the liquid rail pressure is controlled with respect to the gaseous rail pressure during transient 81, the liquid rail pressure can be maintained greater than the gaseous rail pressure, even in the face of uncertain fueling demands by engine 20 during transient 81. This strategy should avoid instances, as in overlap region 83 shown in FIG. 7, where the gaseous rail pressure could briefly exceed the liquid rail pressure causing potential migration of gaseous fuel into the liquid fuel within the individual fuel injectors 30. In addition, by utilizing a separate second rail pressure control logic during a rapid load loss transient, the dual fuel common rail system 29 can be responsive to the fueling needs of engine 20 before, during and after a transient without the need to vent any gaseous fuel to atmosphere from gaseous fuel common rail 40 in order to achieve a lowering of pressure therein. Nevertheless, the present disclosure does recognize that rare circumstances may require some venting of gaseous fuel to atmosphere in order to achieve a pressure drop in the gaseous fuel common rail, and venting natural gas to atmosphere is encompassed by the scope of the present disclosure, but is a least desirable strategy for achieving pressure drop in the gaseous fuel common rail 40.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method of operating an engine comprising the steps of:
    injecting gaseous fuel and liquid fuel directly into an engine cylinder from a gaseous nozzle outlet set and a liquid nozzle outlet set, respectively, of a fuel injector;
    compression igniting the injected liquid fuel to ignite the gaseous fuel;
    inhibiting migration of gaseous fuel into liquid fuel within the fuel injector by maintaining a liquid rail pressure greater than a gas rail pressure;
    the inhibiting step includes executing a first rail pressure control algorithm before and after a transient, and executing a second rail pressure control algorithm during the transient;
    initiating the transient by changing from a high fuel demand state of a first speed and load to a low fuel demand state of a second speed and load.

2. The method of claim 1 wherein execution of the first rail pressure control algorithm includes:
    controlling a liquid rail pressure toward a first predetermined target pressure based upon the first engine speed and load, and controlling a gaseous rail pressure toward a first gas pressure that is lower than the first predetermined pressure prior to the transient; and
    controlling the liquid rail pressure toward a second predetermined target pressure based upon the second engine speed and load, and controlling the gaseous rail pressure toward a second gas pressure that is lower than the second predetermined pressure after the transient; and
    execution of the second rail pressure control algorithm includes:
    controlling the liquid rail pressure toward a transient target pressure that equals the gas rail pressure plus a bias pressure, and controlling the gaseous rail pressure toward the second gas pressure during the transient.

3. The method of claim 1 includes a step of closing a shut off valve fluidly positioned between a gaseous fuel rail and a gaseous fuel supply system during the transient.

4. The method of claim 1 including a step of injecting gaseous fuel and liquid fuel into less than all of a plurality of engine cylinders in at least one engine cycle during the transient.

5. The method of claim 1 wherein each liquid injection event during the transient corresponds to a predetermined minimum injection quantity; and
    allocating a remainder of an engine fuel demand to injection of gaseous fuel during the transient.

6. The method of claim 1 including a step of avoiding venting gaseous fuel from a gaseous fuel rail to atmosphere during the transient.

7. The method of claim 6 wherein execution of the first rail pressure control algorithm includes:
    controlling a liquid rail pressure toward a first predetermined target pressure based upon the first engine speed and load, and controlling gaseous rail pressure toward a first gas pressure that is lower than the first predetermined pressure prior to the transient; and
    controlling the liquid rail pressure toward a second predetermined target pressure based upon the second engine speed and load, and controlling gaseous rail pressure toward a second gas pressure that is lower than the second predetermined pressure after the transient; and
    execution of the second rail pressure control algorithm includes:
    controlling the liquid rail pressure toward a transient target pressure that equals the gas rail pressure plus a bias pressure, and controlling the gaseous rail pressure toward the second gas pressure during the transient.

8. The method of claim 7 includes a step of closing a shut off valve fluidly positioned between a gaseous fuel rail and a gaseous fuel supply system during the transient.

9. The method of claim 7 including a step of injecting gaseous fuel and liquid fuel into less than all of a plurality of engine cylinders in at least one engine cycle during the transient.

10. The method of claim 7 wherein each liquid injection event during the transient corresponds to a predetermined minimum injection quantity; and allocating a remainder of an engine fuel demand to injection of gaseous fuel during the transient.

11. An engine that comprising:

an engine housing that defines a plurality of cylinders within which a plurality of respective pistons reciprocate to define a compression ratio greater the 14:1;

a gaseous fuel common rail and a liquid fuel common rail fluidly connected to each of a plurality of fuel injectors that each include a gaseous nozzle outlet set and a liquid nozzle outlet set positioned for direct injection into one of the cylinders;

means, including electronic controller configured to execute a first rail pressure control algorithm to maintain a liquid rail pressure greater than a gas rail pressure before and after a transient, and execute a second rail pressure control algorithm to maintain the liquid rail pressure greater than the gas rail pressure during the transient, for inhibiting migration of gaseous fuel into liquid fuel within the fuel injector;

wherein the transient includes changing from a high fuel demand state of a first speed and load to a low fuel demand state of a second speed and load.

12. The engine of claim 11 wherein the first rail pressure control algorithm is configured to control the liquid rail pressure toward a first predetermined target pressure based upon the first engine speed and load, and control the gaseous rail pressure toward a first gas pressure that is lower than the first predetermined target pressure prior to the transient; and configured to control the liquid rail pressure toward a second predetermined target pressure based upon the second engine speed and load, and control the gaseous rail pressure toward a second gas pressure that is lower than the second predetermined pressure after the transient; and the second rail pressure control algorithm is configured to control the liquid rail pressure toward a transient target pressure that equals the gas rail pressure plus a bias pressure, and control the gaseous rail pressure toward the second gas pressure during the transient.

13. The engine of claim 11 includes a shut off valve fluidly positioned between a gaseous fuel rail and a gaseous fuel supply system.

14. The engine of claim 13 wherein the second pressure control algorithm is configured to close the shut off valve during the transient.

15. The engine of claim 11 wherein the second pressure control algorithm is configured to inject gaseous fuel and liquid fuel into less than all of a plurality of engine cylinders in at least one engine cycle during the transient.

16. The engine of claim 11 wherein the second pressure control algorithm is configured to avoid venting gas from a gaseous fuel rail to atmosphere during the transient.

17. The engine of claim 16 wherein the first rail pressure control algorithm is configured to control a liquid rail pressure toward a first predetermined target pressure based upon the first engine speed and load, and control a gaseous rail pressure toward a first gas pressure that is lower than the first predetermined pressure prior to the transient; and configured to control the liquid rail pressure toward a second predetermined target pressure based upon the second engine speed and load, and control the gaseous rail pressure toward a second gas pressure that is lower than the second predetermined pressure after the transient; and the second rail pressure control algorithm is configured to control the liquid rail pressure toward a transient target pressure that equals the gas rail pressure plus a bias pressure, and control the gaseous rail pressure toward the second gas pressure during the transient.

18. The engine of claim 17 includes a shut off valve fluidly positioned between a gaseous fuel rail and a gaseous fuel supply system.

19. The engine of claim 18 wherein the second pressure control algorithm is configured to close the shut off valve during the transient.

20. The engine of claim 17 wherein the second pressure control algorithm is configured to inject gaseous fuel and liquid fuel into less than all of a plurality of engine cylinders in at least one engine cycle during the transient.

* * * * *

UNITED STATES PATENT AND TRADEMARK OFFICE
CERTIFICATE OF CORRECTION

PATENT NO. : 9,518,518 B2
APPLICATION NO. : 13/866303
DATED : December 13, 2016
INVENTOR(S) : Coldren et al.

Page 1 of 1

It is certified that error appears in the above-identified patent and that said Letters Patent is hereby corrected as shown below:

In the Claims

Column 11, Line 9, In Claim 11, delete "greater the 14:1;" and insert -- greater than 14:1; --.

Signed and Sealed this
Fourth Day of April, 2017

Michelle K. Lee
*Director of the United States Patent and Trademark Office*